(12) United States Patent
Vasseur et al.

(10) Patent No.: US 9,734,457 B2
(45) Date of Patent: Aug. 15, 2017

(54) LEARNING DATA PROCESSOR FOR DISTRIBUTING LEARNING MACHINES ACROSS LARGE-SCALE NETWORK INFRASTRUCTURES

(71) Applicant: Cisco Technology, Inc., San Jose, CA (US)

(72) Inventors: Jean-Philippe Vasseur, Saint Martin d'Uriage (FR); Grégory Mermoud, Veyras (CH); Sukrit Dasgupta, Norwood, MA (US)

(73) Assignee: Cisco Technology, Inc., San Jose, CA (US)

( * ) Notice: Subject to any disclaimer, the term of this patent is extended or adjusted under 35 U.S.C. 154(b) by 654 days.

(21) Appl. No.: 14/163,638

(22) Filed: Jan. 24, 2014

(65) Prior Publication Data
US 2015/0186798 A1     Jul. 2, 2015

Related U.S. Application Data (60) Provisional application No. 61/922,348, filed on Dec. 31, 2013.

(51) Int. Cl.
| | | |
|---|---|---|
| G06F 15/18 | (2006.01) | |
| G06N 99/00 | (2010.01) | |
| H04L 12/24 | (2006.01) | |
| H04L 29/08 | (2006.01) | |
| H04L 12/851 | (2013.01) | |
| H04L 12/753 | (2013.01) | |
| G06Q 10/06 | (2012.01) | |
| H04L 12/18 | (2006.01) | |

(52) U.S. Cl.
CPC ....... *G06N 99/005* (2013.01); *G06Q 10/0631* (2013.01); *G06Q 10/06375* (2013.01); *H04L 12/185* (2013.01); *H04L 41/145* (2013.01); *H04L 41/147* (2013.01); *H04L 41/16* (2013.01); *H04L 45/48* (2013.01); *H04L 47/2483* (2013.01); *H04L 67/26* (2013.01)

(58) Field of Classification Search
None
See application file for complete search history.

(56) References Cited

U.S. PATENT DOCUMENTS 8,073,968 B1   12/2011   Shah et al.
8,909,950 B1 *   12/2014   Levchuk ............. H04W 52/223
                                                          455/418

(Continued)

OTHER PUBLICATIONS

NBAR2, "NBAR2 or Next Generation NBAR Common questions and answers regarding CISCO NBAR2 or Next Generation Network-Based Application Recognition (NBAR)", Jan. 31, 2013, (URL: http://www.cisco.com/c/en/us/products/collateral/ios-nx-os-software/network-based-application-recognition-nbar/qa_c67-697963.pdf.).*

(Continued)

*Primary Examiner* — Paulinho E Smith
(74) *Attorney, Agent, or Firm* — Parker Ibrahim & Berg LLC; James M. Behmke; Stephen D. LeBarron (57) ABSTRACT

In one embodiment, a learning data processor determines a plurality of machine learning features in a computer network to collect. Upon receiving data corresponding to the plurality of features, the learning data processor may aggregate the data, and pushes the aggregated data for select features to interested learning machines associated with the computer network.

20 Claims, 7 Drawing Sheets

(56) References Cited

U.S. PATENT DOCUMENTS

| | | |
|---|---|---|
| 2002/0174429 A1 | 11/2002 | Gutta et al. |
| 2005/0015583 A1* | 1/2005 | Sarkkinen ............ H04L 12/1859 713/150 |
| 2008/0008104 A1 | 1/2008 | Previdi et al. |
| 2010/0014519 A1* | 1/2010 | Fernandez Gutierrez ............................ H04L 12/185 370/390 |
| 2012/0202538 A1* | 8/2012 | Uusitalo ............ H04B 17/0067 455/500 |
| 2012/0310591 A1* | 12/2012 | Win ..................... G01C 21/165 702/150 |
| 2013/0311673 A1* | 11/2013 | Karthikeyan ......... H04L 41/147 709/239 |
| 2013/0336316 A1* | 12/2013 | Sudhaakar .............. H04L 45/16 370/390 |
| 2014/0071830 A1 | 3/2014 | Weill et al. |
| 2014/0092901 A1* | 4/2014 | Kapadia ................ H04L 45/745 370/390 |
| 2014/0095864 A1* | 4/2014 | Dasgupta ................ H04L 45/64 713/155 |
| 2014/0219078 A1* | 8/2014 | Dasgupta ................ H04L 45/08 370/219 |
| 2014/0219133 A1* | 8/2014 | Dasgupta ................ H04L 47/28 370/254 |
| 2014/0222726 A1* | 8/2014 | Mermoud ............ G06N 99/005 706/12 |
| 2014/0222729 A1* | 8/2014 | Dasgupta ............ G06N 99/005 706/12 |
| 2014/0222731 A1* | 8/2014 | Mermoud ............ G06N 99/005 706/12 |
| 2014/0222748 A1* | 8/2014 | Mermoud ............ H04L 41/142 706/52 |
| 2014/0222983 A1* | 8/2014 | Dasgupta ................ H04L 43/10 709/223 |
| 2014/0222997 A1* | 8/2014 | Mermoud ............ H04L 41/142 709/224 |
| 2014/0379900 A1* | 12/2014 | Dasgupta ................ H04L 41/145 709/224 |
| 2015/0006946 A1* | 1/2015 | Littlefield ........... H04L 41/0686 714/4.1 |
| 2015/0023174 A1* | 1/2015 | Dasgupta ................ H04L 47/24 370/236 |
| 2015/0186799 A1* | 7/2015 | Dasgupta ............ G06N 99/005 706/12 |
| 2015/0188801 A1* | 7/2015 | Dasgupta ................ H04L 41/16 709/243 |
| 2015/0193695 A1* | 7/2015 | Cruz Mota .............. G06N 3/08 706/12 |
| 2015/0332155 A1* | 11/2015 | Mermoud ............ G06N 99/005 706/12 |
| 2015/0333992 A1* | 11/2015 | Vasseur ............... H04L 12/4633 370/252 |
| 2015/0334030 A1* | 11/2015 | Vasseur ................. H04L 47/115 370/230 |
| 2015/0348572 A1* | 12/2015 | Thornburg .............. G10L 25/84 704/219 |
| 2016/0028599 A1* | 1/2016 | Vasseur .................. H04L 41/16 370/252 |
| 2016/0028608 A1* | 1/2016 | Dasgupta ................ H04L 43/12 370/252 |
| 2016/0028616 A1* | 1/2016 | Vasseur .................. H04L 45/22 370/412 |
| 2016/0179577 A1* | 6/2016 | Catthoor ................. G06F 9/505 718/104 |
| 2016/0218951 A1* | 7/2016 | Vasseur .................. H04L 43/12 |
| 2016/0219070 A1* | 7/2016 | Vasseur ................. H04L 45/306 |

OTHER PUBLICATIONS

Vasseur, et al., "A Learning Data Processor for Distributing Learning Machines Across Large-Scale Network Infrastructures", U.S. Appl. No. 61/922,348, filed Dec. 31, 2013, 27 pages, U.S. Patent and Trademark Office, Alexandria, VA.

Winter, et al., "RPL: IPv6 Routing Protocol for Low-Power and Lossy Networks", Request for Comments 6550, Mar. 2012, 157 pages, Internet Engineering Task Force Trust.

"NBAR2 or Next Generation NBAR Common questions and answers regarding CISCO NBAR2 or Next Generation Network-Based Application Recognition (NBAR)", Jan. 31, 2013, URL:http://ww.cisco.com/c/en/us/products/collateral/ios-nx-os-software/network-based-application-recognition-nbar/qa_c67-697963.pdf.

Sheng Zhengguo et al.,: "A survey on the ietf protocol suite for the internet of things: standards, challenges, and opportunities", IEEE Wireless Communications, IEEE Service Center, Piscataway, NJ, US, vol. 20, No. 6, Dec. 1, 2013, pp. 91-98.

JP Vasseur et al.: RFC 6551: Routing Metrics Used for Path Calculation in Low-Power and Lossy Networks, Internet Engineering Task Force (IETF), Mar. 31, 2012, URL:http://tools.ietf.org/pdf/rfc6551.pdf.

* cited by examiner

LEARNING DATA PROCESSOR FOR DISTRIBUTING LEARNING MACHINES ACROSS LARGE-SCALE NETWORK INFRASTRUCTURES

RELATED APPLICATION

This application claims priority to U.S. Provisional Application No. 61/922,348, filed Dec. 31, 2013, entitled: A LEARNING DATA PROCESSOR FOR DISTRIBUTING LEARNING MACHINES ACROSS LARGE-SCALE NETWORK INFRASTRUCTURES, by Vasseur, et al., the contents of which are herein incorporated by reference.

TECHNICAL FIELD

The present disclosure relates generally to computer networks, and, more particularly, to the use of learning machines within computer networks.

BACKGROUND

Low power and Lossy Networks (LLNs), e.g., Internet of Things (IoT) networks, have a myriad of applications, such as sensor networks, Smart Grids, and Smart Cities. Various challenges are presented with LLNs, such as lossy links, low bandwidth, low quality transceivers, battery operation, low memory and/or processing capability, etc. The challenging nature of these networks is exacerbated by the large number of nodes (an order of magnitude larger than a "classic" IP network), thus making the routing, Quality of Service (QoS), security, network management, and traffic engineering extremely challenging, to mention a few.

Machine learning (ML) is concerned with the design and the development of algorithms that take as input empirical data (such as network statistics and performance indicators), and recognize complex patterns in these data. In general, these patterns are then used to make decisions automatically (i.e., close-loop control) or to help make decisions. ML is a very broad discipline used to tackle very different problems (e.g., computer vision, robotics, data mining, search engines, etc.), but the most common tasks are the following: linear and non-linear regression, classification, clustering, dimensionality reduction, anomaly detection, optimization, association rule learning.

One very common pattern among ML algorithms is the use of an underlying model M, whose parameters are optimized for minimizing the cost function associated to M, given the input data. For instance, in the context of classification, the model M may be a straight line that separates the data into two classes such that M=a*x+b*y+c and the cost function would be the number of misclassified points. The ML algorithm then consists in adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Learning Machines (LMs) are computational entities that rely one or more ML algorithm for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator.

Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, techniques are shown and described relating to a learning data processor for distributing learning machines across large-scale network infrastructures. In one embodiment, a learning data processor determines a plurality of machine learning features in a computer network to collect. Upon receiving data corresponding to the plurality of features, the learning data processor may aggregate the data, and pushes the aggregated data for select features to interested learning machines associated with the computer network.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE 1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1:
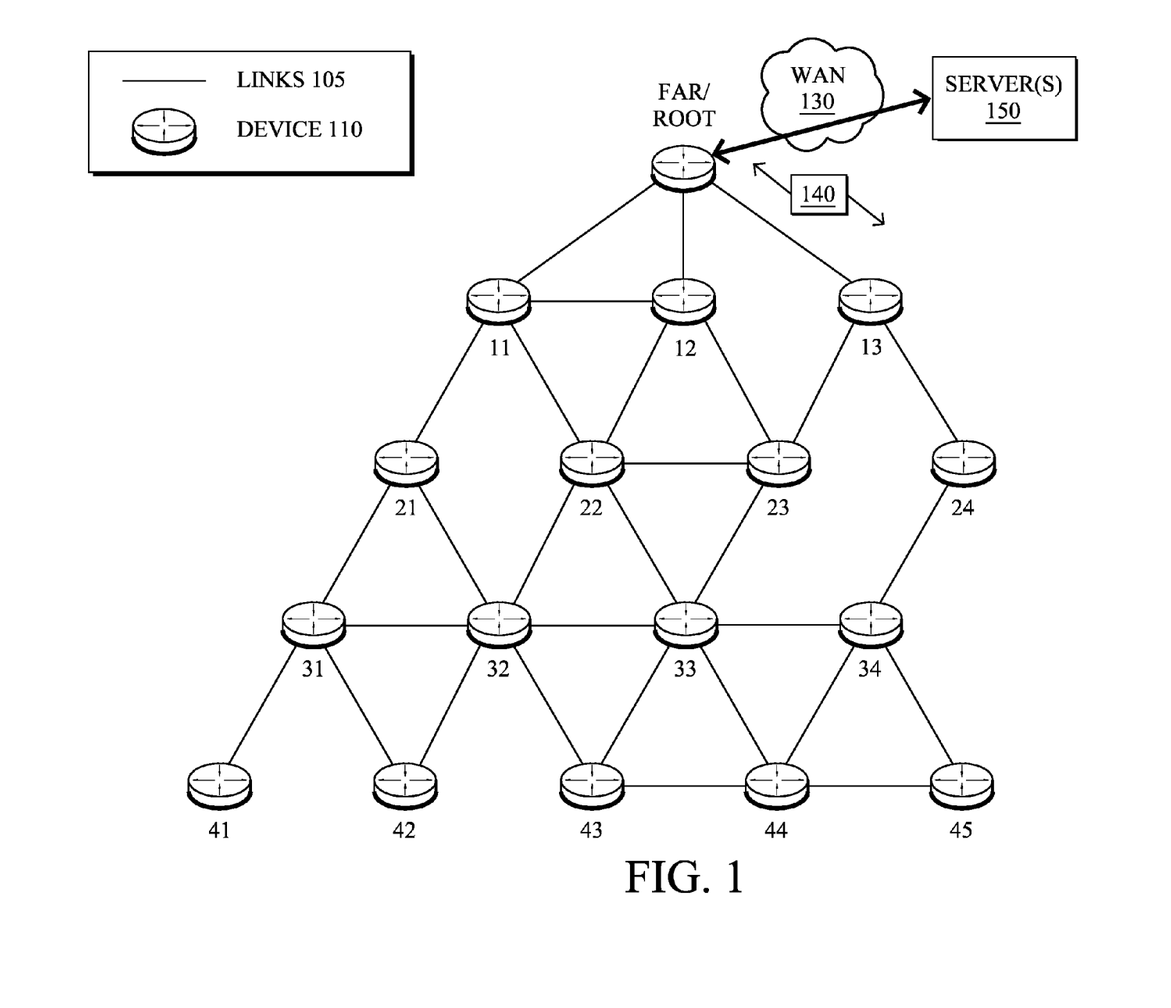
FIG. 1 illustrates an example communication network.

FIG. 1 is a schematic block diagram of an example computer network 100 illustratively comprising nodes/devices 110 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 110, such as, e.g., routers, sensors, computers, etc., may be in communication with other nodes 110, e.g., based on distance, signal strength, current operational status, location, etc. The illustrative root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
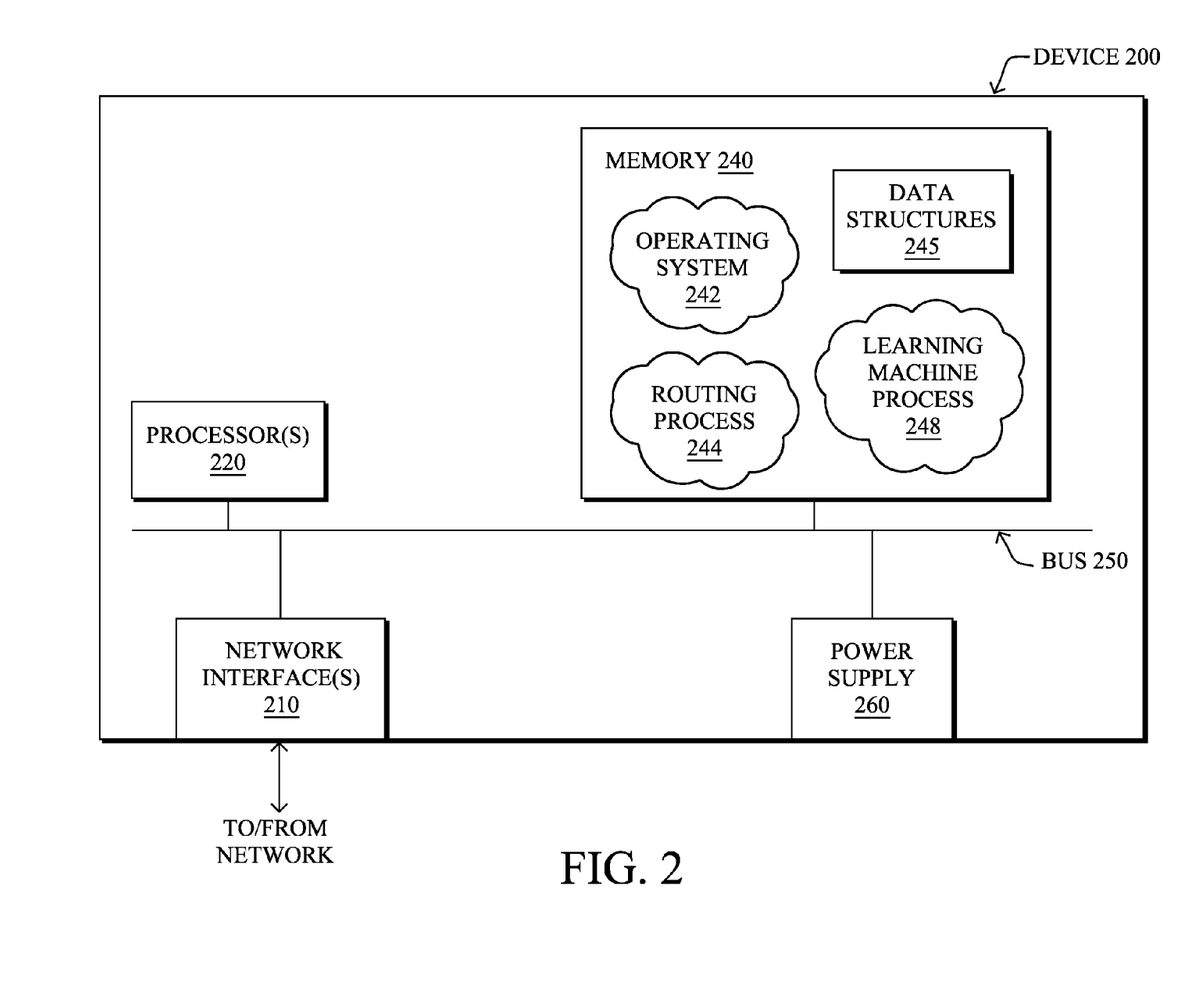
FIG. 2 illustrates an example network device/node.

FIG. 2 is a schematic block diagram of an example node/device 200 that may be used with one or more embodiments described herein, e.g., as any of the nodes or devices shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC (where the PLC signal may be coupled to the power line feeding into the power supply) the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise a routing process/services 244 and an illustrative "learning machine" process 248, which may be configured depending upon the particular node/device within the network 100 with functionality ranging from intelligent learning machine algorithms to merely communicating with intelligent learning machines, as described herein. Note also that while the learning machine process 248 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" (or "Internet of Everything" or "IoE") may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs), FARs, or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by a DAG process and/or routing process 244) based on an Objective Function (OF). The role of the Objective Function is generally to specify rules on how to build the DAG (e.g. number of parents, backup parents, etc.).

Figure 3:
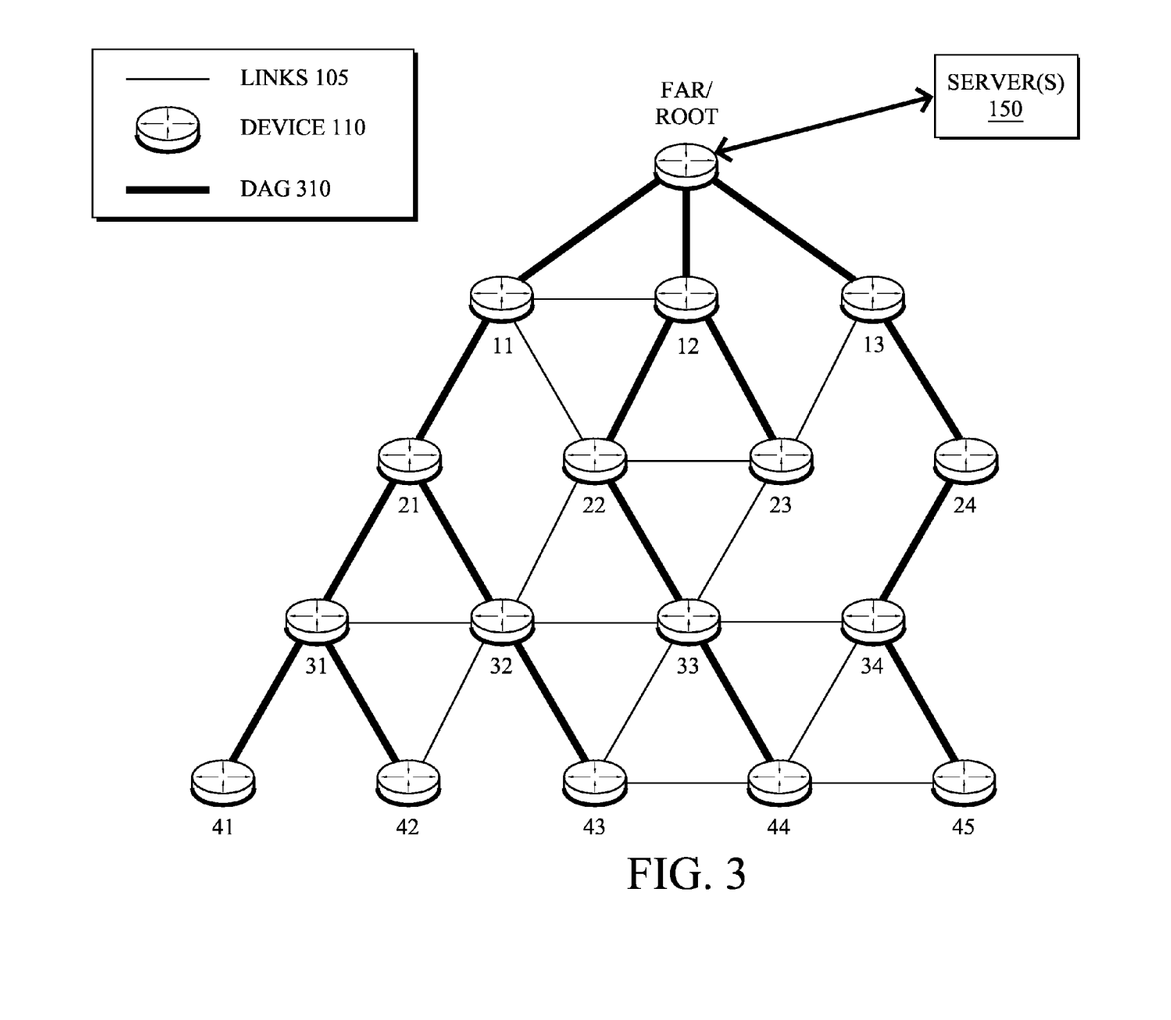
FIG. 3 illustrates an example directed acyclic graph (DAG) in the communication network of FIG. 1.

FIG. 3 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 310 (shown as bolded lines), which extends from the root node toward one or more leaf nodes (nodes without children). Traffic/packets 140 (shown in FIG. 1) may then traverse the DAG 310 in either the upward direction toward the root or downward toward the leaf nodes, particularly as described herein.

RPL supports two modes of operation for maintaining and using Downward routes:

1) Storing Mode: RPL routers unicast DAO messages directly to their DAG Parents. In turn, RPL routers maintain reachable IPv6 addresses for each of their DAG Children in their routing table. Because intermediate RPL routers store Downward routing state, this mode is called Storing mode.

2) Non-Storing Mode: RPL routers unicast DAO messages directly to the DAG Root. The DAO message also includes the IPv6 addresses for the source's DAG Parents. By receiving DAO messages from each RPL router in the network, the DAG Root obtains information about the DAG topology and can use source routing to deliver datagrams. Unlike Storing mode, intermediate RPL routers in Non-Storing mode do not maintain any Downward routes.

Learning Machine Technique(s)

As noted above, machine learning (ML) is concerned with the design and the development of algorithms that take as input empirical data (such as network statistics and performance indicators), and recognize complex patterns in these data. One very common pattern among ML algorithms is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The ML algorithm then consists in adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

As also noted above, learning machines (LMs) are computational entities that rely one or more ML algorithm for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator. Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

In distributed systems such as networks, each Learning Machine (LM) may be distributed across multiple network elements. However, many LMs may require the same type of information for their learning process, which needs to be computed from a broad variety of data sources (e.g., OnePK, NetFlow, NBAR, NBAR2, etc.). Because these data sources are very heterogeneous and most often asynchronous, the LM has only access to partial and outdated data, and it needs to maintain a heavy software infrastructure for computing relevant features from these sources. Also, each LM is collecting large amounts of data, most of which will be discarded because they are not relevant to the task being carried out by the LM. This approach imposes a large and unnecessary traffic overhead on the network, which is usually a limiting factor especially in IoT networks such as LLNs where bandwidth is a very scarce resource. Furthermore, the computational complexity of each LM is dramatically increased due to the required pre-processing, which has been observed in current implementation.

In the techniques herein, however, this problem is addressed by introducing a module that is responsible for collecting and processing data, computing relevant features, and forwarding them to the appropriate LMs. This component is not a mere data processor, but it is capable of learning itself, so as to provide much advanced functionalities than a simple data processor. Hereafter, we refer to this component as a Learning Data Processor (LDP).

Said differently, the techniques herein specify a module called a Learning Data Processor (LDP) that aggregates a large set of data sources such as OnePK, NBAR, NetFlow, etc. and computes a set of features being used by a set of LMs. These features are then pushed via multicast to the various LMs. The LDP dynamically merges features that are strongly correlated (and therefore convey redundant information) and it automatically adjusts the rate of transmission as a function of the variability of the features. The LDP also tackles the problem of data completion by extrapolating the value of the features when data for computing them are not up-to-date or missing. Finally, the LDP performs time-series analysis in order to predict the value of the features in the future, thereby allowing an application to anticipate the output of any LM in the future.

Illustratively, the techniques described herein may be performed by hardware, software, and/or firmware, such as in accordance with the learning machine process 248, which may contain computer executable instructions executed by the processor 220 (or independent processor of interfaces 210) to perform functions relating to the techniques described herein, e.g., optionally in conjunction with other processes. For example, certain aspects of the techniques herein may be treated as extensions to conventional protocols, such as the various communication protocols (e.g., routing process 244), and as such, may be processed by similar components understood in the art that execute those protocols, accordingly. Also, while certain aspects of the techniques herein may be described from the perspective of a single node/device, embodiments described herein may be performed as distributed intelligence, also referred to as edge/distributed computing, such as hosting intelligence within nodes 110 of a Field Area Network in addition to or as an alternative to hosting intelligence within servers 150.

Notably, when stripped of all implementation details, all LMs can essentially be represented as a black-box system that takes a vector x as input, which is called a feature vector, that basically represents the known characteristics of the underlying system. An LM yields a quantity y as output, which is often a scalar, but may be a vector or a higher-level construct such as a probability distribution (such as in the situation where an algorithm such as VBLS is used to predict delays in a network). Depending on the type of LM, the output y may denote a predicted performance metric of the network (e.g., QoS, stability, health, etc.), a detection of anomalies, a DoS attack or other relevant piece of knowledge about the underlying network. The process of learning consists in adjusting the parameters w such that the performance of the LM is maximized (generally by minimizing an error parameter of some sort). Note that many learning algorithms assume that all feature values are relevant to their functioning, available to them at all times, and that they are up-to-date. However, as outlined earlier, this is not the case in most real-world scenarios, and more specifically in (constrained) networks such as LLN (but even in the case of less constrained networks).

Figure 4:
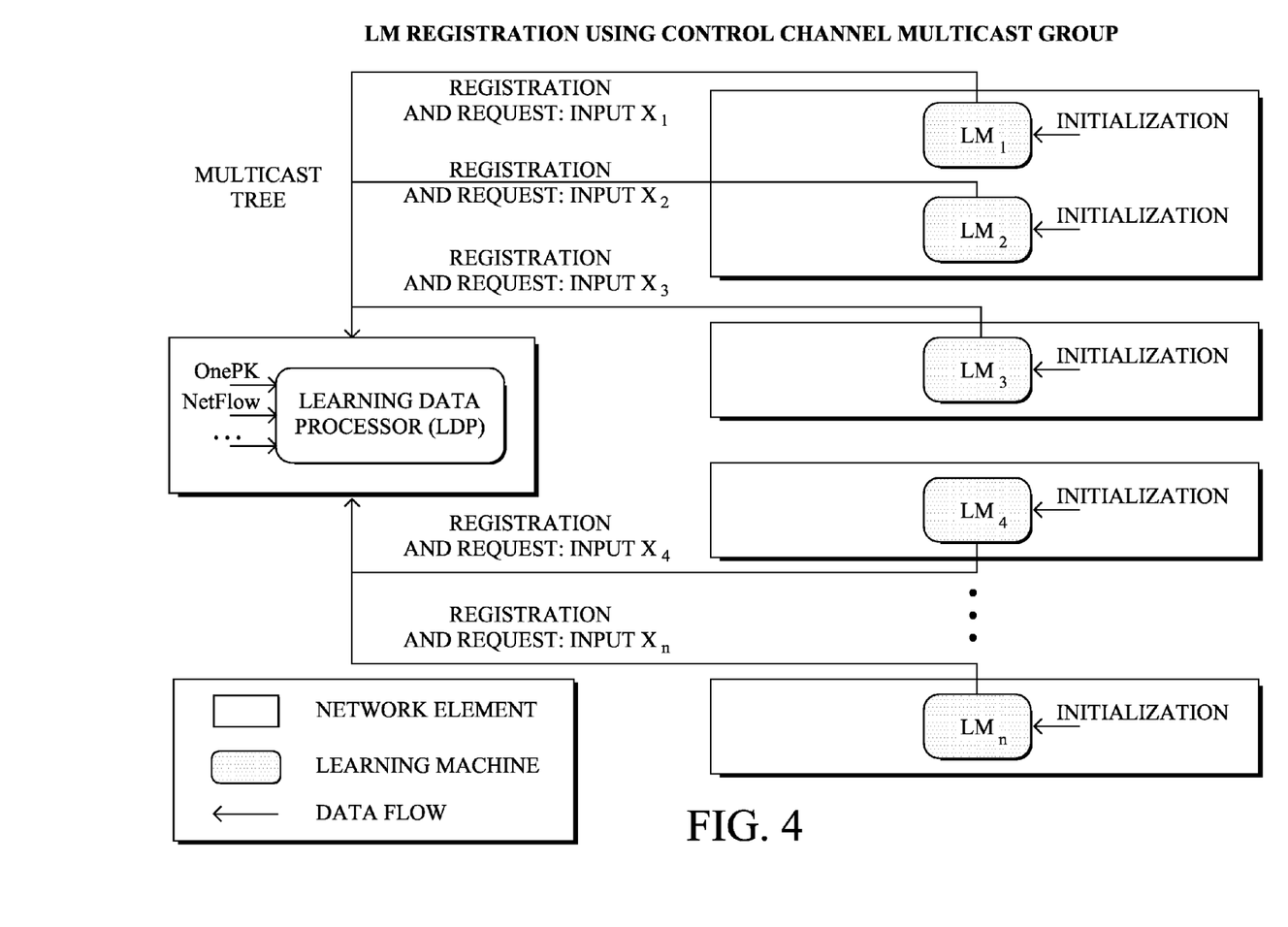
FIGS. 4-6 illustrate an example learning data processor architecture for distributing learning machines across large-scale network infrastructures using learning data processors.
Figure 5:
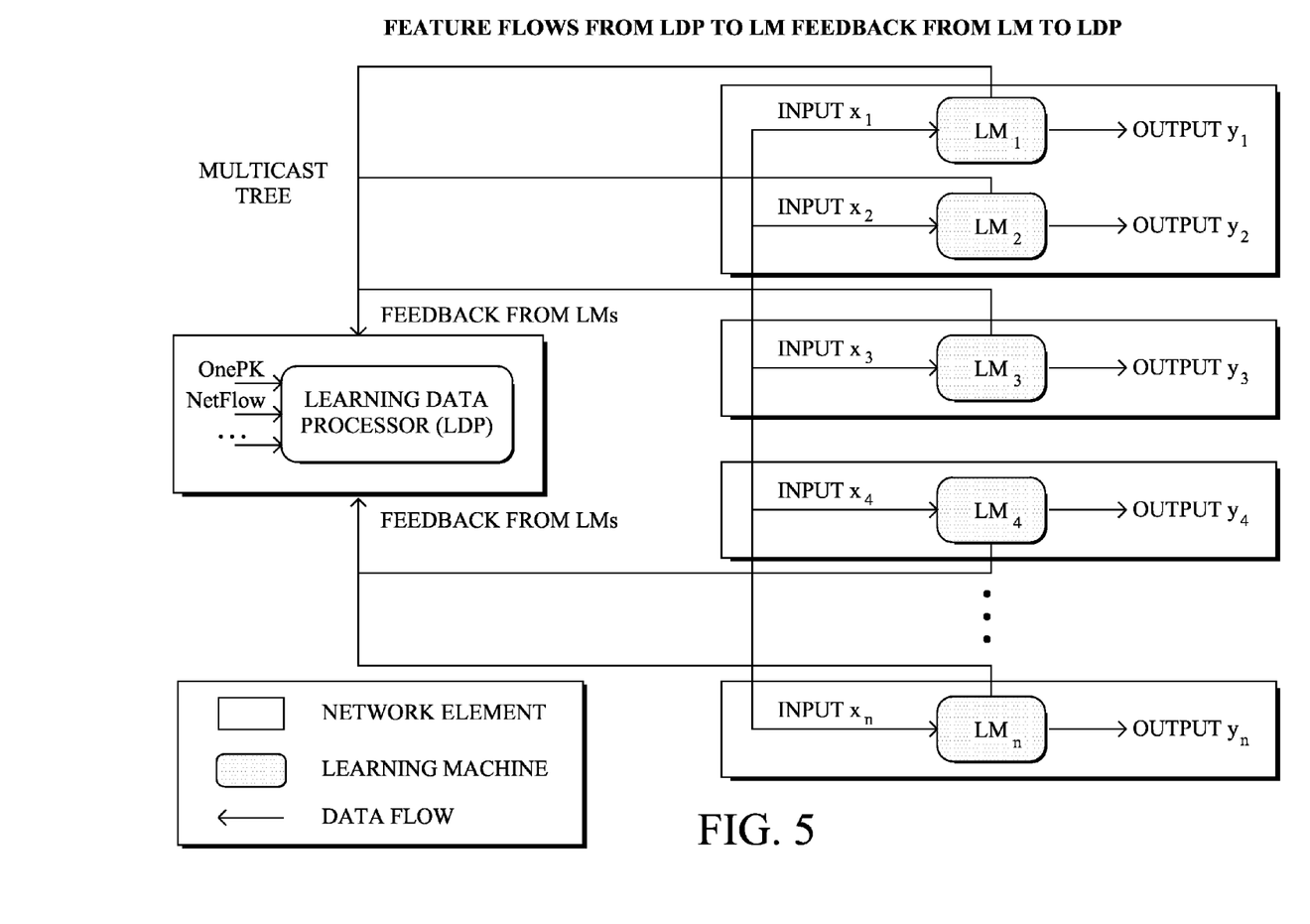
Figure 6:
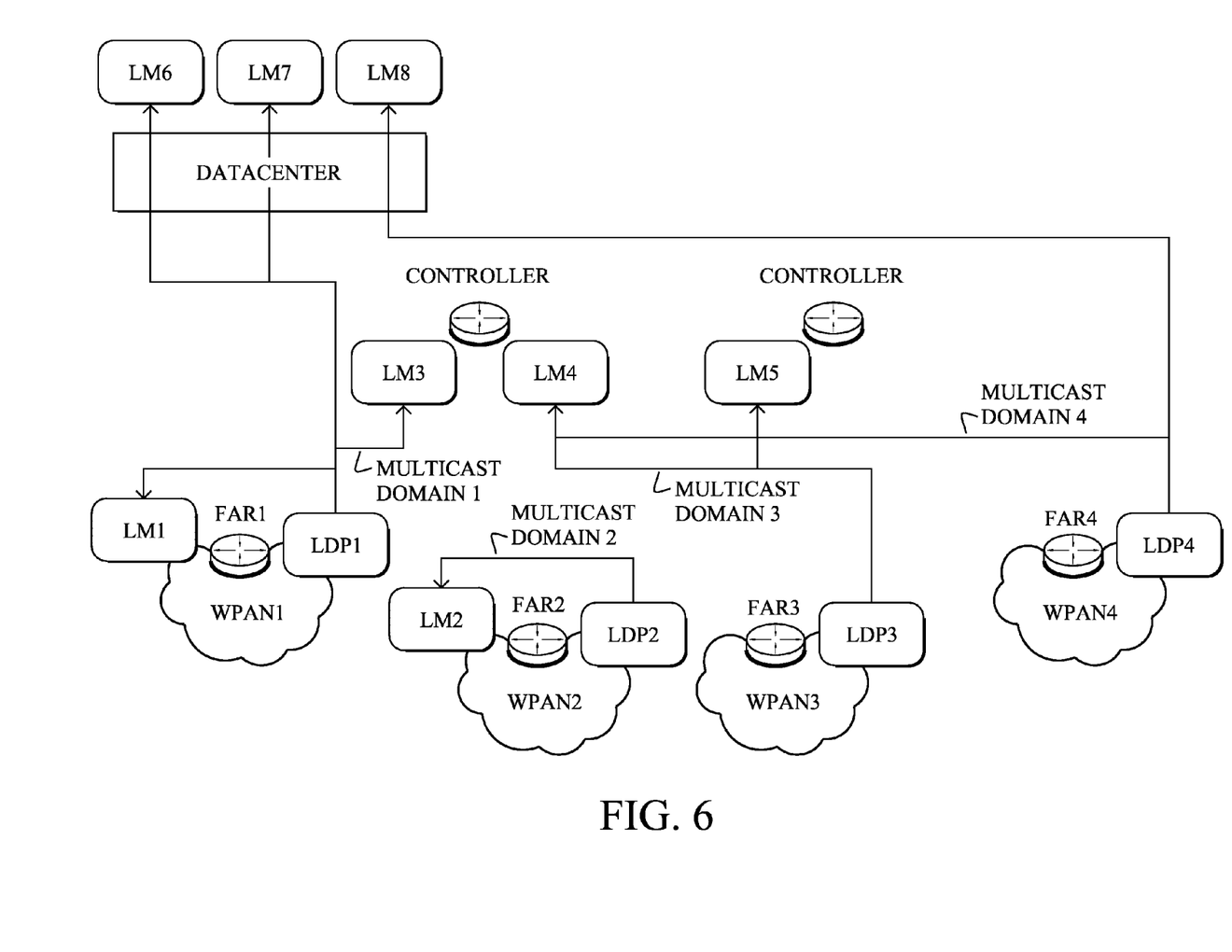

Operationally, as shown in (and with general reference to) FIGS. 4-6, consider a set $S=\{LM1, LM2, \ldots, LMn\}$ of independently running learning machine (LMs) modules. The first component of the techniques herein is a module called a Learning Data Processor (LDP) that will generate the feature vectors x1, x2, x3, . . . , xn that the LMs of the set S take as input (see FIG. 5). Note that not all LM modules will take all vectors as inputs and can chose to pick the ones it finds relevant to the problem. To this end, as shown in FIG. 4, the LDP collects data from many sources (OnePK, NetFlow, NBAR, NBAR2, etc.), and it computes a set of relevant features being used by the LMs of the set S. As shown in FIG. 5, the resulting features may be sent out to the LMs via multicast domains (one per feature) using a newly defined IPv6 unicast/multicast message called the FR( ) message (Feature information); each LM may join the multicast domain corresponding to a feature of interest. An LM may also request the LDP to start publishing a new feature using a novel FR( ) message (Feature request) sent to all known LDPs or using a multicast message along the multicast domain of the said feature (in which case the LDP will create a new multicast domain, which the LM can then join to receive updates of the features). The LMs may dynamically obtain updates about published publication of the set of multicast trees by querying the NMS can be dynamically learned by the LM thanks to the NMS.

In one embodiment, the LM modules can be pre-programmed to join a control channel multicast tree sourced at the LDP (FIG. 4). This control channel tree will be used to share generic information by the LDP with all LMs. Once this join takes place, the LDP can send details about available features and their corresponding multicast trees to the LMs based on which the LMs can decide which groups to join. In another embodiment, instead of a multicast tree, the LMs may listen to a specific application port used by the LDP to share generic information.

The LDP aims at reducing the traffic between the network element where it is hosted (typically, a router or a switch) and the rest of the learning infrastructure, which is often distributed across several other elements (e.g., another blade of the same element, another box, a network controller, a server or the cloud), as illustrated by FIG. 6. To this end, the LDP may perform a statistical analysis of all computed features. Based on this analysis, it reduces the traffic in two ways: (1) it combines strongly correlated features into a feature that is representative of their variation, that is, it simply merges the original features, and (2) it tunes the rate at which updates are sent to the LMs as a function of the variability of the feature. In other words, updates are sent in such a way that the tradeoff between reconstruction accuracy (on the LM end) and traffic is optimized.

For each of the published features, the LDP learns a probabilistic model of the time-evolution of these features, using typically a Kalman or Particle Filter, which may be sometimes combined with other time-series algorithms such as Hidden Markov Models or Liquid-State Machine. Note that the exact nature of the model depends on the implementation and the use case in question.

Based on the above probabilistic mode, the LDP has the ability to perform data completion. That is, even though data needed to compute a given feature F have been missing for an extended period of time, the LDP may use its internal probabilistic model to extrapolate what would be the most likely value of F. When the target LM supports it, the LDP may provide a confidence interval or the whole probability distribution of F.

Last, the LDP relies on the predictive models described above to perform predictive analysis, that is, to extrapolate the value of a given feature in the future. As an example, assume that LM1 is capable of predicting the delay of a given node based on a set of features {F1, F2, F3, F3}. Now, an application needs to anticipate the delay of the said node, say, DeltaT seconds in advance. Instead of crafting a specific LM for this task, it may simply query the LDP for the value of the features at time T+DeltaT, and pass the resulting feature vector to LM1.

Figure 7:
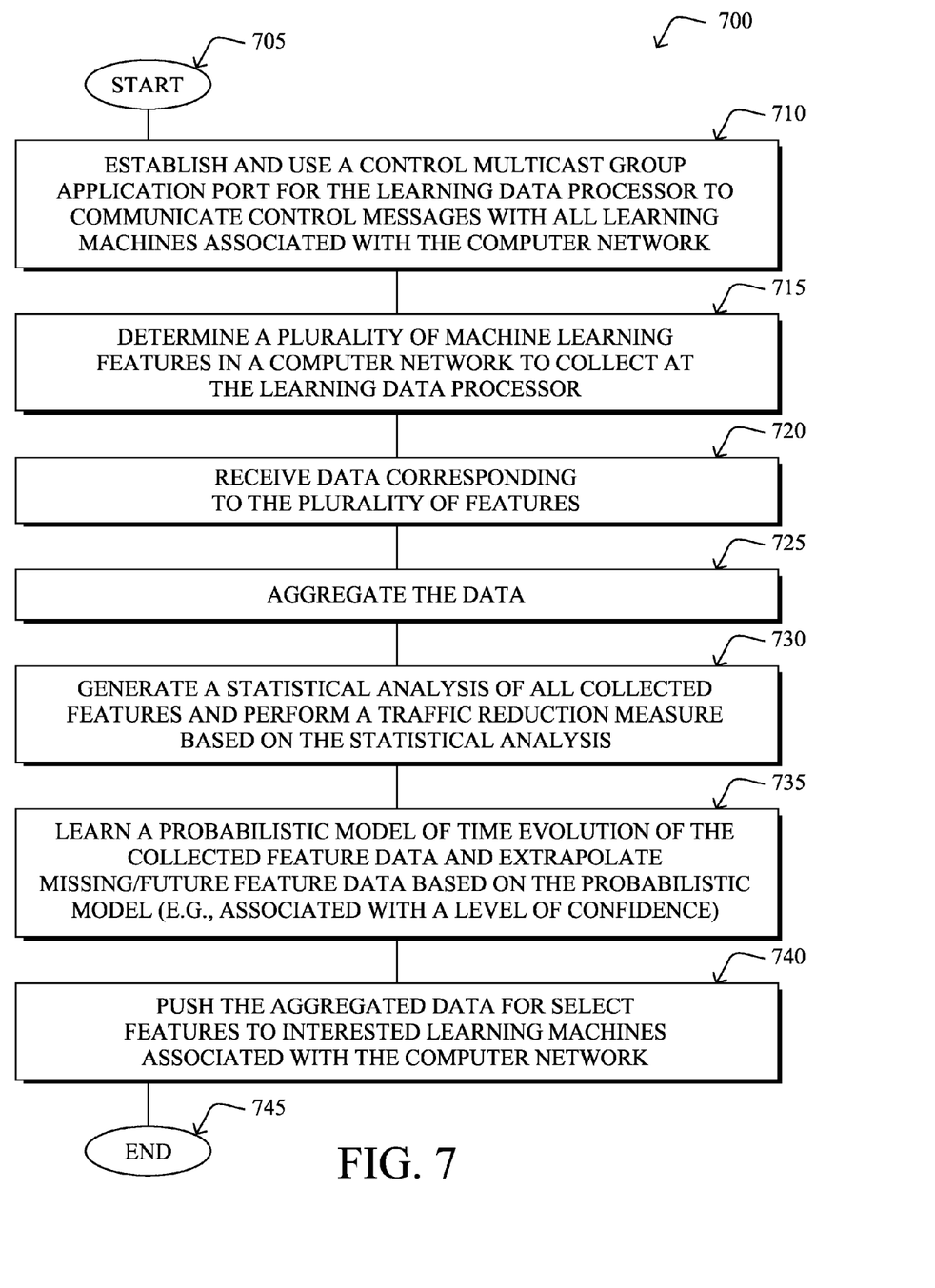
FIG. 7 illustrates an example simplified procedure for a learning data processor for distributing learning machines across large-scale network infrastructures.

FIG. 7 illustrates an example simplified procedure 700 for a learning data processor for distributing learning machines across large-scale network infrastructures in accordance with one or more embodiments described herein. The procedure 700 may start at step 705, and continues to step 710, where, as described in greater detail above, a learning data processor may establish and use a control multicast group or application port to communicate control messages with all learning machines associated with the computer network. Additionally, in step 715, the learning data processor determines a plurality of machine learning features in the computer network to collect, such as through its own determination (e.g., based on what data it receives in the network), or else through explicitly receiving, from the interested learning machines, an indication of features in which they are interested.

In step 720, the learning data processor receives data corresponding to the plurality of features, and aggregates the data in step 725. Note that in one embodiment described above, the learning data processor may generate a statistical analysis of all collected features and perform a traffic reduction measure based on the statistical analysis in step 730, such as by combining correlated features into a representative feature or tuning a rate at which updates of the aggregated data are pushed to the learning machines (e.g., as a function of feature variability). Also, in one embodiment described above, the learning data process may learn a probabilistic (and predictive) model of time evolution of the collected feature data, and extrapolates missing/future feature data based on the probabilistic model in step 735 (e.g., also illustratively associating the predictive model with a level of confidence).

In step 740, the learning data processor may push the aggregated data for select features to interested learning machines associated with the computer network as detailed above. For instance, the learning data processor may multicast each type of aggregated data within a corresponding multicast group, where interested learning machines join multicast groups for features in which they are interested (that is, the learning data processor may select the selected features to push as only those collected features in which one or more learning machines associated with the network are interested). Alternatively, pushing data may involve replying to specific requests, whether from learning machines or from various applications associated with the computer network.

The illustrative and simplified procedure 700 ends in step 745. Note that though the procedure is shown with an end, the techniques described herein may continue to update data, interested features, subscribed learning machines, probabilistic models, etc., accordingly. It should also be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for a learning data processor for distributing learning machines across large-scale network infrastructures. In particular, the techniques herein tackle the problem of computing features from a large, heterogeneous, and asynchronous set of data sources in LLNs and conventional networks. The solution proposed herein provides a clear encapsulation of the complexity related to data completion, compression, and transmission rate tuning. As a result, it enables software and network architectures for learning networks in which the LMs may be distributed across the whole network while minimizing the traffic overhead and the complexity of each LM.

While there have been shown and described illustrative embodiments that provide for a learning data processor for distributing learning machines across large-scale network infrastructures, it is to be understood that various other adaptations and modifications may be made within the spirit and scope of the embodiments herein. For example, the embodiments have been shown and described herein with relation to LLNs and related protocols. However, the embodiments in their broader sense are not as limited, and may, in fact, be used with other types of communication networks and/or protocols. In addition, while the embodiments have been shown and described with relation to learning machines in the specific context of communication networks, certain techniques and/or certain aspects of the techniques may apply to learning machines in general without the need for relation to communication networks, as will be understood by those skilled in the art.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    determining a plurality of machine learning features in a computer network to collect at a learning data processor;
    receiving data corresponding to the plurality of features;
    aggregating the data;
    generating a statistical analysis of all collected features;
    performing a traffic reduction measure based on the statistical analysis;
    learning a probabilistic model of time evolution of the received feature data; and
    pushing the aggregated data for select features to interested learning machines associated with the computer network.

2. The method as in claim 1, wherein pushing comprises:
    multicasting each type of aggregated data within a corresponding multicast group, wherein interested learning machines join multicast groups for features in which they are interested.

3. The method as in claim 1, further comprising:
    receiving, from the interested learning machines, an indication of features in which they are interested.

4. The method as in claim 1, further comprising:
    establishing and using a control multicast group for the learning data processor to communicate control messages with all learning machines associated with the computer network.

5. The method as in claim 1, further comprising:
    using a control application port for the learning data processor to communicate control messages with all learning machines associated with the computer network.

6. The method as in claim 1, further comprising:
    selecting the selected features to push as only those collected features in which one or more learning machines associated with the network are interested.

7. The method as in claim 1, wherein the traffic reduction measure comprises:
    combining correlated features into a representative feature.

8. The method as in claim 1, wherein the traffic reduction measure comprises:
    tuning a rate at which updates of the aggregated data are pushed to the learning machines.

9. The method as in claim 8, further comprising:
    tuning the rate as a function of feature variability.

10. The method as in claim 1, further comprising:
    extrapolating missing feature data based on the probabilistic model.

11. The method as in claim 1, further comprising:
    extrapolating future feature data based on the probabilistic model.

12. The method as in claim 1, further comprising:
    associating the predictive model with a level of confidence.

13. An apparatus, comprising:
    one or more network interfaces that communicate with a computer network;
    a processor coupled to the one or more network interfaces and configured to execute a process; and
    a memory configured to store process executable by the processor, the process when executed operable to:
        determine a plurality of machine learning features in the computer network to collect as a learning data processor;
        receive data corresponding to the plurality of features;
        aggregate the data;
        generate a statistical analysis of all collected features;
        perform a traffic reduction measure based on the statistical analysis;
        learn a probabilistic model of time evolution of the received feature data; and
        push the aggregated data for select features to interested learning machines associated with the computer network.

14. The apparatus as in claim 13, wherein the process when executed to push is further operable to:
    multicast each type of aggregated data within a corresponding multicast group, wherein interested learning machines join multicast groups for features in which they are interested.

15. The apparatus as in claim 13, wherein the process when executed is further operable to:
    receive, from the interested learning machines, an indication of features in which they are interested.

16. The apparatus as in claim 13, wherein the process when executed is further operable to:
    perform the traffic reduction measure by combining correlated features into a representative feature based on the statistical analysis.

17. The apparatus as in claim 13, wherein the process when executed is further operable to:
    perform the traffic reduction measure by tuning a rate at which updates of the aggregated data are pushed to the learning machines based on the statistical analysis.

18. The apparatus as in claim 13, wherein the process when executed is further operable to:
    extrapolate missing feature data based on the probabilistic model.

19. The apparatus as in claim 13, wherein the process when executed is further operable to:
    extrapolate future feature data based on the probabilistic model.

20. A tangible, non-transitory, computer-readable media having software encoded thereon, the software, when executed by a processor, operable to:
    determine a plurality of machine learning features in the computer network to collect as a learning data processor;
    receive data corresponding to the plurality of features;
    aggregate the data;
    generate a statistical analysis of all collected features;
    perform a traffic reduction measure based on the statistical analysis;
    learn a probabilistic model of time evolution of the received feature data; and
    push the aggregated data for select features to interested learning machines associated with the computer network.

* * * * *

UNITED STATES PATENT AND TRADEMARK OFFICE
CERTIFICATE OF CORRECTION

PATENT NO. : 9,734,457 B2  Page 1 of 1
APPLICATION NO. : 14/163638
DATED : August 15, 2017
INVENTOR(S) : Jean-Philippe Vasseur et al.

It is certified that error appears in the above-identified patent and that said Letters Patent is hereby corrected as shown below:

In the Specification

In Column 8, Line 49, please amend as shown:
defined IPv6 unicast/multicast message called the FI( )

Signed and Sealed this
Twenty-second Day of December, 2020

Andrei Iancu
*Director of the United States Patent and Trademark Office*